June 10, 1930.                L. ROUANET                 1,762,891
METHOD OF MOUNTING SINGLE AND DOUBLE ROW BALL BEARINGS
Filed Jan. 16, 1928
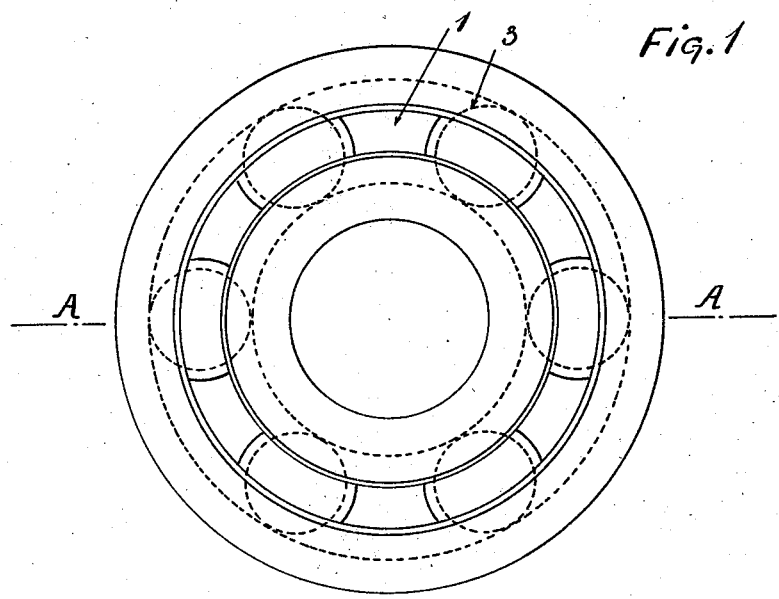
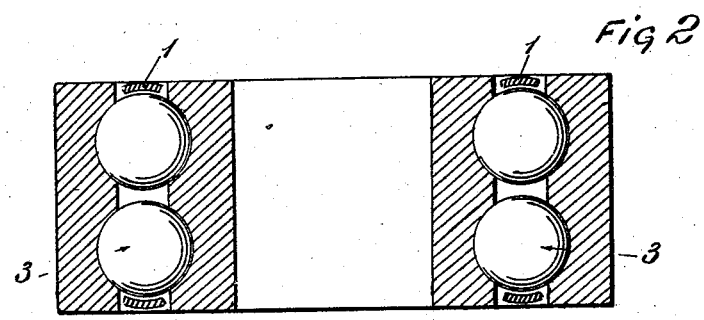
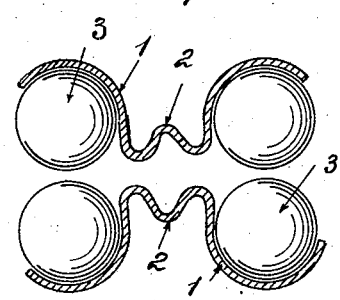 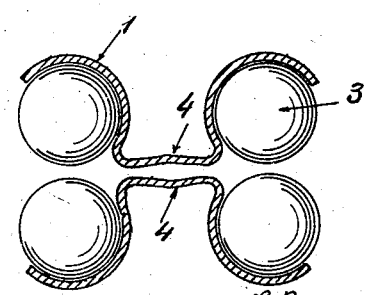
L. Rouanet
INVENTOR Patented June 10, 1930

1,762,891

UNITED STATES PATENT OFFICE

LOUIS ROUANET, OF IVRY-PORT, FRANCE, ASSIGNOR TO COMPAGNIE D'APPLICATIONS MECANIQUES, OF IVRY-PORT, FRANCE

METHOD OF MOUNTING SINGLE AND DOUBLE ROW BALL BEARINGS

Application filed January 16, 1928, Serial No. 247,206, and in France January 20, 1927.

The present invention relates to a process of mounting or assembling ball bearings in which use is made of temporary shaped cages built up from strips of material adapted to be deformed which receive a suitable corrugated shape, so that when mounting the bearings, the said corrugated strips can be rapidly and easily deformed in order to accommodate and retain the balls correctly in their operative positions.

According to one of the preferred methods of carrying out the invention, the aforesaid process is characterized in that certain parts of the cage, particularly the parts projecting between the balls, are, previously to the assembly, shaped with a rather pronounced M section, the middle or central V in each M portion being pressed inwards after the cage has been put into position on the balls, so as to cause a permanent change in the shape of the cage and to complete the housings for the balls in order to retain same in their final positions.

The said process enables suitably shaped tools to be used for obtaining an accurate permanent change of shape in the M shaped loops or sections, the said tools being easily and rapidly centered on the middle or central V portions of the said loops.

Obviously it is sufficient that points of the V portions in the M shaped separating loops in the strip should be exactly located and calibrated to obtain the automatic and correct distribution of the balls between their tracks when assembling the bearings, something which cannot be obtained by the hitherto known methods, particularly in case of the assembly of double row ball bearings, in which the bended parts of the bands holding the balls are located opposite each other and very close together and to the middle or central plane of the bearing.

In the case of such double row ball bearings, the process according to the invention enables the axial length of the bearings to be reduced to the minimum value enabling a satisfactory operation, and practically the distance between the middle or central planes of each of the tracks can be made equal to twice the radius of the balls, increased naturally by the working play and the play corresponding to the different distortions produced during operation under load of the bearing.

The accompanying drawing shows, by way of example, the invention applied to the assembly of a double row ball bearing.

In the said drawing:

Fig. 1 is a side view of a double row ball bearing of the radial type provided with a cage according to the invention.

Fig. 2 is a sectional view taken along the line A—A in Fig. 1.

Fig. 3 is a partial sectional view of the cage ready for the assembly.

Fig. 4 is a view similar to Fig. 3 but showing one of the final forms with which the cage can be shaped.

According to the invention, cages are used each composed of a corrugated strip 1 of a material adapted to be deformed, and which has received the shape illustrated in Fig. 3. In this figure it will be seen that the loop-shaped part projecting between two balls 3 has a rather pronounced M section and therefore has a central or middle V portion as indicated at 2.

The cage thus prepared being placed on a row of balls, the point of each V is pressed inwards so as to open the V as shown in Fig. 4 and to permanently change the shape of the said loops. The latter thus assume a shape such that the cage is effectively retained in position on the balls.

The points of the V portions on the separating loops being exactly located and calibrated, and it being possible to center the tools used for flattening the said V portions, rapidly and easily on the said points, the distribution of the balls is automatic and correct.

The axial dimension of the cage before the assembly being apporoximately equal to the final dimension, on account of the shape preliminary imparted to the corrugated strip it results that the axial length of double row ball bearings can be reduced to a minimum, since the adjacent parts 4 of the two cages can almost abut each other after the shape has been permanently deformed, on account of the form previously given to the cages.

The invention is applicable both to single row and to double row ball bearings as well as to bearings of both the axial and the radial type. The forms or sections illustrated in the drawing are only given as examples and other forms or sections could be used both before and after the strips are deformed without departing from the principles of the invention.

Claims:

1. A process of assembling ball bearings which consists in inserting between concentric races a suitable number of balls, shaping strips of deformable material, to include loops adapted to surround a part of a ball and corrugated loops adapted to extend between each pair of adjacent balls, placing the shaped strips on the rows of balls so that the corrugated loops project between the balls, and flattening the corrugated loops so as to more completely surround the balls and retain the latter in the bearing.

2. A process of assembling ball bearings which consists in inserting between concentric races a suitable number of balls, shaping strips of deformable material to include loops adapted to surround a part of ball and corrugated loops in the form of an M adapted to extend between each pair of adjacent balls, placing the shaped strips on the rows of balls so that the M shaped loops project between the balls, and flattening the corrugated part of each M shaped loop so as to more completely surround the balls and retain the latter in the bearing.

3. A process of assembling ball bearings which consists in inserting between concentric races a suitable number of balls, shaping strips of deformable material to include loops adapted to surround a part of a ball and corrugated loops in the form of an M adapted to extend between each pair of adjacent balls, placing the shaped strips on the rows of balls so that the M shaped loops project between the balls, and exerting a pressure on the V shaped portion of the M shaped loops in order to regularly distribute the balls and retain the latter in the bearing.

4. A process of assembling ball bearings which consists in inserting between concentric races a suitable number of balls, shaping strips of deformable material to give said strips a corrugated shape including loops having a substantially M shaped section, placing the shaped strips on the row of balls so that the looped parts of M shaped section project between the balls, and flattening simultaneously the central portion of all the M shaped parts in order to regularly distriubte and retain the balls between the races of the bearing.

5. A process of assembling ball bearings which consists in inserting between concentric races a suitable number of balls, shaping strips of deformable material to give said strips a corrugated shape including loops having a substantially M shaped section with a centered middle V portion, placing the shaped strips on the row of balls so that the looped parts of M shaped section project between the balls and pressing simultaneously on the points of the V portions in order to flatten the central part of the M shaped loops and regularly distribute the balls between the races of the bearing.

6. A prepared cage for ball bearings formed of a strip of deformable material, said strip having a corrugated shape including loops adapted to surround a part of a ball and parts of M shaped section connecting the loops with the V shaped portion of the M shaped part between said loops.

In testimony whereof I affix my signature.

LOUIS ROUANET.